United States Patent
Xue et al.

(10) Patent No.: US 8,670,425 B1
(45) Date of Patent: Mar. 11, 2014

(54) USE OF PAST DURATION OF STAY AS TRIGGER TO SCAN FOR WIRELESS COVERAGE

(75) Inventors: Wen Xue, Overland Park, KS (US); Shoba Umamaheswaran, Overland Park, KS (US); Philip M. Kunkel, Overland Park, KS (US); Jay Cole, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 337 days.

(21) Appl. No.: 13/206,130

(22) Filed: Aug. 9, 2011

(51) Int. Cl.
*H04W 4/00* (2009.01)

(52) U.S. Cl.
USPC .................. 370/338; 370/310.2; 370/329

(58) Field of Classification Search
USPC ...................... 370/338, 310.2, 435
See application file for complete search history.

(56) References Cited

U.S. PATENT DOCUMENTS

| | | |
|---|---|---|
| 4,765,753 A | 8/1988 | Schmidt |
| 5,093,926 A | 3/1992 | Sasuta |
| 5,392,331 A | 2/1995 | Patsiokas et al. |
| 5,392,458 A | 2/1995 | Sasuta et al. |
| 5,404,376 A | 4/1995 | Dent |
| 5,434,950 A | 7/1995 | Kaallman |
| 5,442,805 A | 8/1995 | Sagers et al. |
| 5,459,759 A | 10/1995 | Schilling |
| 5,508,708 A | 4/1996 | Ghosh et al. |
| 5,513,246 A | 4/1996 | Jonsson et al. |
| 5,539,744 A | 7/1996 | Chu et al. |
| 5,640,676 A | 6/1997 | Garncarz et al. |
| 5,650,770 A | 7/1997 | Schlager et al. |
| 5,737,703 A | 4/1998 | Byrne |
| 5,794,146 A | 8/1998 | Sevcik et al. |
| RE35,916 E | 10/1998 | Dennison et al. |
| 5,857,155 A | 1/1999 | Hill et al. |
| 5,901,354 A | 5/1999 | Menich et al. |
| 5,913,168 A | 6/1999 | Moreau et al. |
| 5,915,221 A | 6/1999 | Sawyer et al. |
| 5,933,114 A | 8/1999 | Eizenhofer et al. |
| 5,953,667 A | 9/1999 | Kauppi |
| 5,963,130 A | 10/1999 | Schlager et al. |
| 5,983,109 A | 11/1999 | Montoya |
| 6,006,096 A | 12/1999 | Trompower |
| 6,026,301 A | 2/2000 | Satarasinghe |

(Continued)

OTHER PUBLICATIONS

Android Forums, "Switching Between WiFi & Verison . . . H . . . ," androidforums.com/ . . . /13351-switching- . . . , printed from the World Wide Web on Feb. 18, 2011.

(Continued)

*Primary Examiner* — Anh-Vu Ly
*Assistant Examiner* — Hashim Bhatti (57) ABSTRACT

A method, apparatus, and system for causing a mobile wireless device to begin scanning for wireless network coverage. A determination is made, based on one or more past instances of the mobile device being in a particular area, that the mobile device tends to be in the particular area for at least a threshold duration per instance. Further, a determination is made that the mobile device is currently located in the particular area. In response to at least the determination that the mobile device tends to be in the particular area for at least the threshold duration per instance and the determination that the mobile device is currently in the particular area, the mobile device will be made to scan for wireless network coverage, such as coverage of a network that is known exist in the particular area.

20 Claims, 6 Drawing Sheets

(56) References Cited

U.S. PATENT DOCUMENTS

| | | | |
|---|---|---|---|
| 6,038,451 | A | 3/2000 | Syed et al. |
| 6,052,590 | A | 4/2000 | Hicks et al. |
| 6,075,989 | A | 6/2000 | Moore et al. |
| 6,088,594 | A | 7/2000 | Kingdon et al. |
| 6,088,694 | A | 7/2000 | Burns et al. |
| 6,108,533 | A | 8/2000 | Brohoff |
| 6,151,498 | A | 11/2000 | Roel-Ng et al. |
| 6,167,268 | A | 12/2000 | Souissi et al. |
| 6,195,342 | B1 | 2/2001 | Rohani |
| 6,198,390 | B1 | 3/2001 | Schlager et al. |
| 6,321,090 | B1 | 11/2001 | Soliman |
| 6,324,404 | B1 | 11/2001 | Dennison et al. |
| 6,351,642 | B1 | 2/2002 | Corbett et al. |
| 6,360,098 | B1 | 3/2002 | Ganesh et al. |
| 6,363,255 | B1 | 3/2002 | Kuwahara |
| 6,438,117 | B1 | 8/2002 | Grilli et al. |
| 6,445,912 | B1 | 9/2002 | Cole et al. |
| 6,449,305 | B1 | 9/2002 | Menich et al. |
| 6,473,619 | B1 | 10/2002 | Kong et al. |
| 6,498,785 | B1 | 12/2002 | Derryberry et al. |
| 6,522,888 | B1 | 2/2003 | Garceran et al. |
| 6,549,781 | B1 | 4/2003 | O'Byrne et al. |
| 6,570,862 | B2 | 5/2003 | Virtanen |
| 6,594,253 | B1 | 7/2003 | Sallberg et al. |
| 6,597,906 | B1 | 7/2003 | Van Leeuwen et al. |
| 6,631,263 | B1 | 10/2003 | Corkery |
| 6,667,962 | B1 | 12/2003 | Lee et al. |
| 6,680,923 | B1 | 1/2004 | Leon |
| 6,714,789 | B1 | 3/2004 | Oh et al. |
| 6,731,622 | B1 | 5/2004 | Frank et al. |
| 6,934,546 | B1 | 8/2005 | Corbett et al. |
| 7,092,722 | B1 | 8/2006 | Oh et al. |
| 7,200,397 | B1 | 4/2007 | Jones et al. |
| 7,277,710 | B1 | 10/2007 | Jones et al. |
| 8,160,611 | B1 | 4/2012 | Oroskar |
| 8,472,978 | B2 * | 6/2013 | Montemurro ............. 455/456.1 |
| 2001/0036830 | A1 | 11/2001 | Wu et al. |
| 2002/0027889 | A1 | 3/2002 | Yun et al. |
| 2002/0102976 | A1 | 8/2002 | Newbury et al. |
| 2002/0147024 | A1 | 10/2002 | Wan |
| 2002/0198004 | A1 | 12/2002 | Heie et al. |
| 2003/0017831 | A1 | 1/2003 | Lee et al. |
| 2003/0017837 | A1 | 1/2003 | Kalliojarvi |
| 2003/0091021 | A1 | 5/2003 | Trossen et al. |
| 2003/0118015 | A1 | 6/2003 | Gunnarsson et al. |
| 2003/0134636 | A1 | 7/2003 | Sundar et al. |
| 2003/0207683 | A1 * | 11/2003 | Lempio et al. ............. 455/422.1 |
| 2004/0176024 | A1 | 9/2004 | Hsu et al. |
| 2004/0176101 | A1 | 9/2004 | Shoki et al. |
| 2004/0203780 | A1 | 10/2004 | Julka et al. |
| 2009/0131081 | A1 | 5/2009 | Abdel-Kader et al. |
| 2009/0296635 | A1 * | 12/2009 | Hui et al. ..................... 370/328 |
| 2010/0208711 | A1 * | 8/2010 | Georgis et al. ................ 370/338 |
| 2010/0240352 | A1 * | 9/2010 | Suri et al. ..................... 455/419 |
| 2011/0299422 | A1 * | 12/2011 | Kim et al. ..................... 370/253 |

OTHER PUBLICATIONS

A. Saleh, "A Location-aided Decision Algorithm for Handoff Across heterogeneous Wireless Overlay Networks," thesis submitted to faculty of Virginia Polytechnic Institute and State University in partial fulfillment of the requirements for the degree of Master of Science in Computer Engineering, Jul. 8, 2004.

I. Akyildiz, "Mobility management in Next-Generation Wireless Systems," Proceedings of the IEEE, vol. 87, No. 8, pp. 1347-1384, Aug. 1999.

A. Angus, "ReFLEX™ & IEEE 802.11—How ReFLEX NPCS Networks Can Make WiFi Better," http://www.braddye.com/ReFLEX_802_4s.pdf, printed from the World Wide Web on Jan. 23, 2004.

A. Angus, "ReFLEX™ & IEEE 802.11—How ReFLEX NPCS Networks Can Make Wi-Fi Better," printed from the World Wide Web on Oct. 28, 2003.

V. Garg, et al., "Applications of CDMA in Wireless/Personal Communications," Prentice Hall PTR, Chapter 13, pp. 334-336, 1997.

T. La Porta, et al., "Comparison of Signaling Loads for PCS Systems," http:citeseer.nj.nec.com/cache/papers/cs/11341/http:zSzzSzwww.bell-labs.comzSzuserzSztlpzSzpcs_ld.fm.pdf/porta95comparison.pdf, printed from the World Wide Web on Oct. 28, 2003.

Y. Lin, "Comparing Soft and Hard Handoffs," http://citeseer.nj.nec.com/cache/papers/cs/8464/http:zSzzSzliny.csie.nctu.edu.twzSztvt97c.pdf/submitted-to-ieee-trans.pdf, printed from the World Wide Web on Oct. 28, 2003.

R. Ramjee, et al., "Performance Evaluation of Connection Rerouting Schemes for ATM-Based Wireless Networks," IEEE./ACM Transactions on Networking, vol. 6, No. 3, pp. 249-261, Jun. 1998.

R. Ramjee, "Supporting Connection Mobility in Wireless Networks," Dissertation submitted to the Graduate School of the University of Massachusetts Amherst in partial fulfillment of the requirements for the degree of Doctor of Philosophy, pp. 1-154, May 1997.

J. Trotter and M. Cravatts, "A Wireless Adapter Architecture for Mobile Computing," http://www.usenix.org/publications/library/proceedings/mob95/full_papers/trotter.txt, printed from the World Wide Web on Oct. 28, 2003.

J. Oh, "5. CDMA," http://edu.hansung.ac.kr/~jtoh/mobile/ch5.ppt, printed from the World Wide Web on Dec. 16, 2003.

S. Das, et al., "Dynamic Load Balancing Through Coordinated Scheduling in Packet Data Systems," http://www.ieee.infocom.org/2003/papers/19_04.PDF, printed from the World Wide Web on Dec. 16, 2003.

P. Bedell, a reference excerpt taken from the book titled "Cellular/PCS Management: A Real World Perspective," http://www.privateline.com/Cellbasics/CDMAmanage.pdf, printed from the World Wide Web on Oct. 28, 2003.

* cited by examiner

USE OF PAST DURATION OF STAY AS TRIGGER TO SCAN FOR WIRELESS COVERAGE

BACKGROUND

It has become increasingly common for mobile wireless devices to support communication through multiple types of access networks. For example, cell phones now commonly include at least one cellular transceiver for communicating with a cellular network and further include a WIFI interface for communicating with a wireless local area network, in addition to perhaps other interfaces.

When such a device is operating in one type of access network, it may be desirable for the device to scan for availability of coverage in another type of access network, to facilitate possible handoff to or concurrent operation in the other access network. An incentive for doing this may be to achieve reduced cost, higher signal strength, and/or faster communication speed.

For instance, while a device is being served by a macro cellular wireless network, the device may incur airtime charges and may experience inconsistent signal strength and connection speeds due to network congestion or distance from a serving cell tower. It could therefore be advantageous, when possible, for such a device to instead (or additionally) operate with WIFI connectivity or to connect with a private femtocell, which may provide the device with service at a reduced or no cost and may provide the device with improved signal strength and communication speed.

OVERVIEW

As a general matter, when a mobile device is being served by a particular access network (current network), it may be preferable for the device to scan for coverage of another access network (target network). However, due to battery power limitations, it may be impractical for the device to constantly, or even periodically, engage in such scanning.

One solution to this problem is to use a known location of target network coverage as a basis to trigger scanning for coverage of the target network. For example, the mobile device may track its own geographic or in-building location at times when the mobile device is being served by the target network, and the device may thereby establish data that correlates location with target network coverage. When the device is thereafter being served by the current network, the device may then likewise track its own location and determine from the data when its location is near or within coverage of the target network. Upon determining that it is near or within coverage of the target network, the device may then automatically begin scanning for coverage of the target network.

As another example, a network server may track geographic location of one or more devices as they are served by the target network so as to establish similar target network coverage-location correlation data. While the mobile device is then being served by the current network, the same or another server may then monitor the device's location and use the data as a basis to determine when the device is near or within coverage of the target network. Upon determining that the device is near or within coverage of the target network, the server may then signal to the device to cause the device to begin scanning for coverage of the target network.

Furthermore, use of the target coverage location as a trigger to begin scanning for target network coverage can be refined by taking into account whether or not the device at issue is currently stationary or is moving (e.g., at least a threshold speed). If the device is currently stationary (or moving very little) and the device is currently at a location where the target network provides coverage, then it may make sense for the device to begin scanning for target network coverage. On the other hand, if the device is moving (or sufficiently moving), then the fact that the device is currently at that location may not as reasonably justify having the device begin scanning for target network coverage, since there is a fair chance that the device may soon move away from the target network coverage.

Disclosed herein is a further improvement, which can be implemented separately or in combination with either or both of the above solutions. As disclosed, a determination will be made, based on one or more past instances of a mobile device being in a particular area, that the mobile device tends to be in the particular area for at least a threshold duration per instance. Further, a determination will be made that the mobile device is currently located in the particular area. In response to at least the determination that the mobile device tends to be in the particular area for at least the threshold duration per instance and the determination that the mobile device is currently in the particular area, the mobile device will then be caused to scan for wireless network coverage, such as for coverage of a target network that is known exist in the particular area.

This method can advantageously apply in a scenario where the mobile device is being served by a current network, and the solution can thus facilitate having the device scan for coverage of a target network so as to facilitate handoff to or concurrent operation in the target network. Alternatively, this method can apply in a scenario where the mobile device is not currently being served by any network, and the solution can still advantageously facilitate a determination of when the device should be scanning for target network coverage to facilitate registration with and service by a wireless network.

Without limitation, three example scenarios where this method can apply are (i) where the mobile device is being served by a cellular network and the method facilitates having the device begin scanning for WIFI or other wireless local area network coverage, (ii) where the device is being served by a macro cellular network (e.g., public base station tower) and the method facilitates having the device begin scanning for coverage of a femtocell (e.g., private base station), and (iii) where the device is not currently being served by any network and the method facilitates having the device begin scanning for network coverage. Numerous other examples, including variations of these examples, are possible as well.

These as well as other aspects, advantages, and alternatives will become apparent to those of ordinary skill in the art by reading the following detailed description, with reference where appropriate to the accompanying drawings. Further, it should be understood that the disclosure provided in this overview section and elsewhere in this document is intended to discuss the invention by way of example only and not by way of limitation.

DETAILED DESCRIPTION

The particular area at issue in the present method may have been defined in advance through any means, and method may then involve (i) determining whether the mobile device tends to be in that area at least a threshold duration per discrete instance, by evaluating durations of past discrete instance of the mobile device being in the area and, if so, (ii) causing the device to begin scanning for network coverage when the device is again in the area.

In practice, for instance, the area at issue may be defined geographically, with geographic coordinates (e.g., latitude/longitude coordinates) demarcating the perimeter or other scope of the area. That way, a determination can be made of when the mobile device enters and exits the area by monitoring a geographic location of the mobile device and determining when that location is within the defined geographic scope of the area.

Further, the area may be defined by proximity sensors or other communication mechanisms that demarcate the area implicitly by governing one or more doorways, receptions, or other passages into and out of the area. That way, a determination can be made of when the mobile device enters the area by determining that the mobile device has passed into the area through the one or more passages, and a determination can then be made of when the mobile device exits the area by determining that the mobile device has passed out of the area through the one or more passages.

Still further, the area may be defined by the radio-frequency (RF) coverage of one or more wireless access nodes. That way, a determination can be made of when the mobile device enters the area by determining when the mobile device registers with or otherwise begins communication with such an access node (e.g., sending communications to the access node and/or receiving communications from the access node), and the a determination can be made of when the mobile device exits the area by determining when the mobile device deregisters with or stops communicating with the access node (e.g., stops receiving from the access node or stops transmitting to the access node).

The RF coverage provided by the one or more access nodes could be the target network coverage that the mobile device would be caused to scan for in accordance with the present method. In that case, the RF coverage and thus the area at issue could be defined by geographic coordinates or another area-definition mechanism, to facilitate subsequently detecting presence of the mobile device in the area and to then cause the mobile device to begin scanning for the target network coverage.

Alternatively, the RF coverage provided by the one or more access nodes could be coverage other than the target network coverage but could nevertheless usefully define the area where the mobile device could be caused to scan for target network coverage. For instance, if the target network coverage is provided by a local access node such as a WIFI access point or femtocell, the area could be defined by a macro cellular coverage area that encompasses the target network coverage area. That way, presence of the mobile device in the macro coverage area and knowledge, from past experience, that the mobile device tends to be in the macro coverage area for at least the threshold duration per instance, could be a basis to cause the mobile device to begin scanning for coverage of the local access node.

Although the area at issue could be defined before implementation of the present method, a more specific implementation of the method may additionally include the function of dynamically defining the area. For example, if the area is defined by the RF coverage of one or more wireless access nodes, then the method may additionally may involve tracking where the mobile device and/or one or more other mobile devices are located (e.g., geographically or with respect to some other markers) when operating within that RF coverage, and dynamically defining the area based on that tracked location data. Moreover, in an implementation where the area is defined dynamically based on presence of the mobile device in the area, the duration of the mobile device's presence in the area could be tracked at the same time as the area is being defined, in order to establish how long the mobile device tends to be in the area per discrete instance, so as to then facilitate determining whether the device tends to be in the area for at least a threshold duration.

Figure 1:
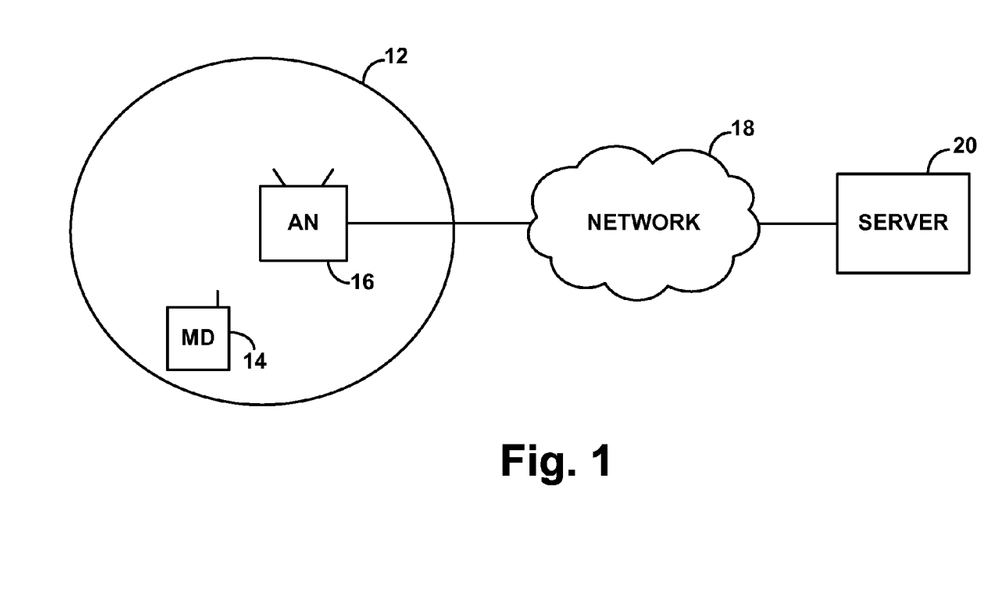
FIG. 1 is a generalized representation of an area that may be used to trigger scanning for wireless network coverage according to the present method.

As a general example of the present method, FIG. 1 depicts a representative area 12, and within the area a representative mobile device 14 and a representative wireless access node (e.g., base station or access point) 16. In accordance with the method, when a determination is made that device 14 is located within area 12 and a determination is made from past experience that mobile device 14 tends to be located within area 12 for at least a threshold period of time, then the present method will cause device 14 to begin scanning for wireless network coverage, such as coverage provided by access node 16 for instance.

As noted above, access node 16 could have a radio frequency (RF) radiation pattern that itself defines area 12 or is largely coterminous with area 12. In that case, it may be particularly efficient to cause the mobile device to begin scanning for coverage of access node 16 when the mobile device is located within area 12 if, based on past experience, the mobile device tends to be in area 12 for at least the threshold duration. Alternatively, however, the RF coverage provided by access node 16 may exist in just part of area 12. Still in that case, it may be efficient to cause the mobile device to begin scanning for coverage of access node 16 when the mobile device is located within area 12 and, based on past experience, tends to be there for at least the threshold duration, since the chances of the mobile device detecting coverage of access node 16 when within area 12 may be substantially higher than when the mobile device is located elsewhere.

Although representative area 12 is shown as a fairly even ellipse, the area could take any of a variety of forms, the details of which are not critical to an understanding of the method. As merely one other example, for instance, the area could be rectangular or otherwise polygonal, defined as a room of a building.

As shown in FIG. 1, access node 16 may be coupled with a network 18, which could include various network infrastructure and could provide connectivity with a representative server 20. In this arrangement, when mobile device 14 is located within coverage of access node 16, the mobile device may engage in air interface communication with the access node and, via the access node, with one or more entities in or on network 18, such as server 20. In practice, of server 20 may also be functionally integrated with a wireless access node or one or more other entities, so that the wireless access node or one or more other entities may function as the server.

The air interface communication between access node 16 and mobile device 14 may comply with any agreed air interface protocol, examples of which include CDMA (e.g., 1xRTT or EV-DO), WiMAX, LTE, IDEN, GSM, HSDPA, WIFI, BLUETOOTH, or other protocols now known or later developed. In accordance with the air interface protocol, access node 16 may regularly broadcast a pilot signal, beacon, or other air interface communication that indicates the presence of wireless network coverage provided by the access node and may include a unique identifier associated with that coverage. Mobile device 14 may then be equipped with a transceiver that operates when appropriate to scan for such a signal in an effort to detect the presence of wireless network coverage.

When mobile device 14 detects wireless network coverage provided by access node 16, the mobile device may engage in a process of registering with the access node or associated network infrastructure. The mobile device may then operate in an idle mode within the coverage area and, when appropriate, may work with the access node to establish active communication sessions with one or more other entities.

To facilitate determination of the location of mobile device 14, the mobile device may be equipped with one or more location determination mechanisms. This location determination mechanism can itself take various forms, depending on how the mobile device's location will be determined. For example, if the mobile device's location will be determined through use of global positioning technology, then the device may include a global positioning system (GPS) receiver so as to receive satellite signals that can be used to facilitate determining the geographic location coordinates of the mobile device. As another example, if the mobile device's location will be determined by reference to proximity sensors (e.g., RFID sensor or tags) or other instruments defining or governing a passage into and out of the area at issue, then the mobile device may include a corresponding passage detection mechanism (e.g., RFID tags or sensors). And as still another example, if the mobile device's location will be determined by the fact that the mobile device is located within particular RF coverage, then the mobile device may include a transceiver arranged to facilitate detection of when the mobile device is within that RF coverage.

Alternatively, the present method could be arranged such that an entity other than (or in addition to) the mobile device 14 determines the mobile device's location. For example, if the mobile device is served by a wireless service provider that implements a mobile location determination system, the service provider could determine the mobile device's location through operation of that system. As another example, if the area at issue is defined by sensors or other instruments at the passageway into and out of the area, a server communicatively linked to those sensors could be arranged to track when the mobile device is within the area based on operation of the passageway sensors. And as another example, if the area at issue is defined by RF coverage provided by a wireless service provider, the wireless service provider could track when the mobile device is registered with or otherwise in communication with that coverage area as an indication of the mobile device's presence in the area. Other examples are possible as well.

Figure 2:
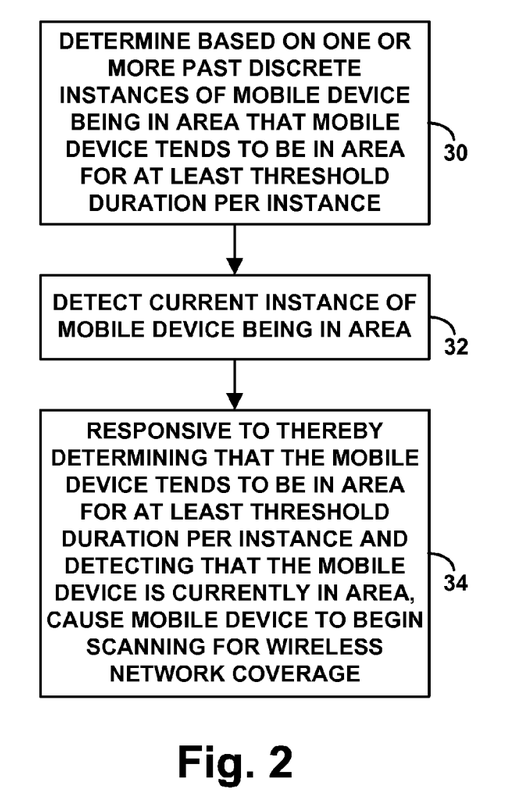
FIG. 2 is a flow chart depicting functions that can be carried out in accordance with the method.

Referring next to FIG. 2, a flow chart is provided to illustrate functions that can be carried out in accordance with the present method. These functions can be carried out by mobile device 14 or by one or more other entities, such as server 20 for instance. Further, variations from the functions shown may be possible.

As shown in FIG. 2, at block 30, the method involves determining based on one or more past discrete instances of mobile device 14 being in area 12 that the mobile device tends to be in area 12 for at least a threshold duration per instance. At block 32, the method further involves detecting a current instance of the mobile device being in area 12. And at block 34, the method involves, responsive to a combination of thereby determining that the mobile device tends to be in area 12 for at least threshold duration per instance and detecting that the mobile device is currently in area 12, causing the mobile device to begin scanning for wireless network coverage.

The function of determining based on one or more past discrete instances of the mobile device being in area 12 that the mobile device tends to be in area 12 for at least the threshold duration can take various forms.

At a minimum, this function involves considering one or more discrete instances of the mobile device being in area 12. A discrete instance of the mobile device being in area 12 is an instance that is separate from, and not contiguous in time with, any other instance of the mobile device being in area 12. In practice, for example, each time the device is in area 12 may be a discrete instance, and the instance may be begin when the device is first determined to be in area 12 and may end when the device is determined to be in another area or otherwise to be out of area 12.

For two instances to be discrete instances, the method may require at least a threshold period of time between when the mobile device is determined to no longer be in area 12 to a time when the mobile device is determined to again be in area 12. By the same token, if there is less than a threshold period of time between two instances, such as where the device momentarily exits the area and re-enters the area, it may be reasonable to conclude that the instances are not discrete but rather cooperatively define a single discrete instance. Alternatively or additionally, for two instances to be discrete instances, the method may require presence of the mobile device at a location that is at least a threshold distance from area 12 in between the two instances, which would justify a conclusion that the mobile device was clearly out of area 12 between the instances of being in area 12.

Device 14 or server 20 may identify discrete instances of the device being in area 12, provided with data and logic to determine when the device enters and exits area 12 and perhaps when the device is in the area.

For example, provided with data that defines the geographic coordinates of the area, the device may track its own location to determine when it is within that area, or a server may track the device's location to determine when it is within the area. As another example, provided with data that defines the area with respect to a passageway sensor, the device or server may determine based on the passageway sensor when the device is within the area. And as another example, provided with data that defines the area as where a wireless access node provides RF coverage, the device or server may determine when the device is within the area by determining when the device is registered with or engaging in signaling or bearer communication with (e.g., receiving from or transmitting to) the access node. Further, the device may determine when it enters or exits the area by receiving one or more communications from the server indicating that the device is entering or exiting the area. And likewise, the server may determine when the device enters or exits the area by receiving one or more communications from the device indicating that the device is entering or exiting the area.

By programmatically tracking times when the device enters and exits area 12, the device or server may thereby determine on a per instance basis how long the device is present in the area. In practice, the device or server may record in data storage each such duration, and the device or server may subsequently compute, based on one or more such discrete instances, a representative measure (e.g., average, median, or minimum) of how long the device tends to be in the area per instance. Alternatively, the device or server may maintain a running computation of such a representative measure, such as a running average of how long the device is in the area per instance, so that the device or server can make use of that information when appropriate.

In practice, the device and/or server may regularly evaluate the established representative measure of how long the device tends to be in area 12, to determine whether that duration is at least as long as a threshold duration. The device and/or server may then maintain an indication for the defined area 12 of whether the area should constitute a trigger area for wireless coverage scanning. If the determination is that the mobile device tends to be in the area for at least a threshold duration per instance, then the area may be deemed a trigger area, whereas if the determination is that the mobile device does not tend to be in the area for at least the threshold duration per instance, then the area might not be deemed a trigger area. Alternatively, rather than maintaining such an indication, the device or server may make the determination in real time (based on the durations of one or more past discrete instances) in response to detecting a current discrete instance of the mobile device being located in the area.

The threshold duration may be user-configurable. Further, the threshold should clearly be a non-zero value that is sufficient to justify having the mobile device begin to scan for coverage. Thus, being at least the threshold may not be met merely by being non-zero but would rather be met by being at least the non-zero threshold duration. As a specific example, the threshold duration could be set to a value of greater than one minute, or a value of greater than five minutes. Other examples are possible as well.

Once a determination is made, based on one or more past discrete instances, that the mobile device tends to be in the area for at least the threshold duration, and a current discrete instance of the of the mobile device being in the area is detected, the function of causing the mobile device to then begin scanning for wireless network coverage may likewise be carried out by the device or the server.

For example, if the device implements the logic to detect the current discrete instance of the device being in the area and to determine, based on or more past discrete instances, that the device tends to be in the area for at least the threshold duration, then that device logic may signal to other logic or components of the device, such as transceiver, to cause the device to begin scanning for wireless network coverage. For instance, the logic may cause the device to turn on a transceiver that was otherwise powered off, such as a local wireless network transceiver, so that the transceiver would begin scanning for network coverage.

As another example, if the server implements the logic to detect the current discrete instance of the device being in the area and to determine, based on or more past discrete instances, that the device tends to be in the area for at least the threshold duration, then that server logic may signal to the device to cause the device to begin scanning for wireless network coverage. For instance, the serve may send a coded message, such as a paging channel message and/or an SMS (short message service) message to the device, and logic on the device would be arranged to respond to that message by turning on a wireless transceiver and/or otherwise beginning to scan for wireless network coverage.

Figure 3:
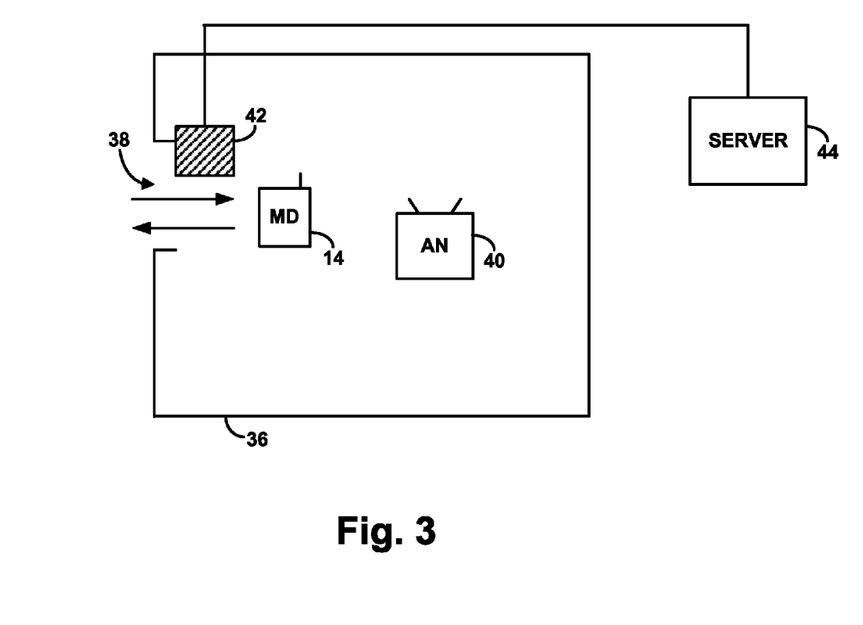
FIG. 3 is a generalized representation of an area that may be demarcated by a passageway into and out of the area and that may also be used to trigger scanning for wireless network coverage according to the method.

FIG. 3 illustrates one of numerous example arrangements in which the present method can be implemented. In particular, FIG. 3 depicts a room or other area 36 having a doorway or other passageway 38 through which mobile device 14 can enter and exit the area 36. Positioned within area 36 is a wireless access node 40 that radiates to define target wireless network coverage. Further, positioned at the passageway 38 is a mechanism 42, such as an RFID tag or sensor, that interacts with a corresponding mechanism in the mobile device or associated equipment to facilitate detecting when the mobile device enters and exits area 36. Mechanism 42 may in turn be communicatively linked with a server 44.

With this arrangement, as mobile device 14 enters and exits area 36 as indicated by interaction with mechanism 42, device 14 and/or server 44 may keep track of how long the device is in the area 36 for each discrete instance. Further, device 14 and/or server 44 may evaluate the durations of stay of the mobile device in area 36 for one or more such discrete instances and may thereby establish a representative measure (e.g., average) of how long the device tends to be in the area 36 per discrete instance. In accordance with the method, when device 14 and/or server 44 detect a current discrete instance of the device being in area 36, if the established representative measure of how long the device tends to be in area 36 is at least the threshold duration, then the device and/or server will cause the device to begin scanning for wireless network coverage. For instance, this may involve causing the device to begin scanning for coverage provided by access node 40.

Note that a combination of location mechanisms could be applied in this or other example processes. For example, to determine from one or more past discrete instances of the mobile device being in area 36 that the mobile device tends to be in the area for at least the threshold duration, the method may use the passageway detection mechanism 42 to track the device entering and exiting the area. But in turn, to detect a current discrete instance of the device being in the area, the method may then compare geographic location coordinates of the device (e.g., determined with GPS technology) with established geographic location coordinates of area 36, to determine when the device enters and exits the area. As another example, the method may use geographic location coordinates to determine, from discrete instances, that the device tends to be in the area for at least the threshold duration, and the method may then use the passageway detection mechanism 42 to detect a current discrete instance of the device being in the area. Other combinations of location mechanisms could be possible as well.

Figure 4:
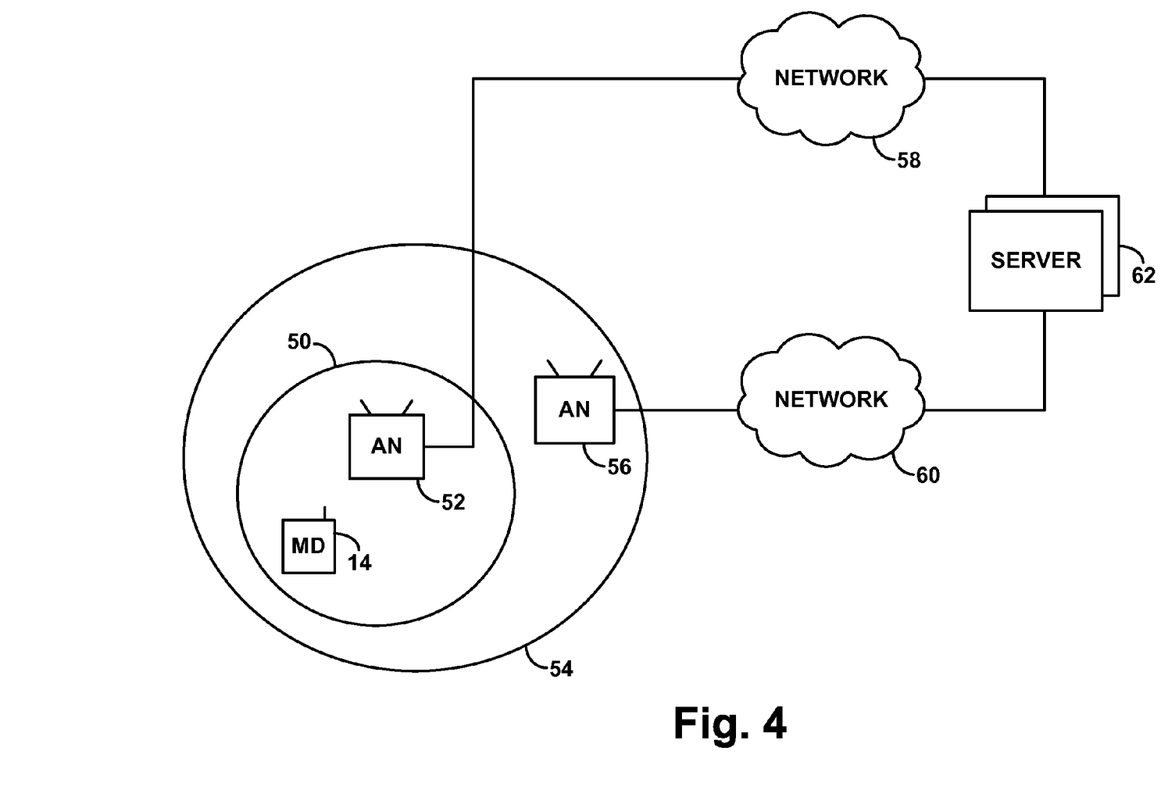
FIG. 4 is a generalized representation of another arrangement in which the present method can be implemented.

FIG. 4 next illustrates another example arrangement in which the present method can be implemented. In particular, FIG. 3 depicts a first wireless coverage area 50 defined by RF radiation from a first wireless access node 52, and a second wireless coverage area 54 defined by RF radiation from a second wireless access node 56. In practice, the first wireless access node 52 may be a local access node, such as a WIFI access point or femtocell located in a home or office, and the first wireless coverage area 50 may be of somewhat limited scope. The second wireless access node 56 may then be part of a broader wireless network, such as a cellular base station tower of a macro cellular wireless network for instance, and the second wireless coverage area 54 may then be a broader coverage area, which may encompass or at least partially overlap with the first wireless coverage area.

Both of the access nodes 52, 56 in this arrangement are shown coupled with networks 58, 60 that provide connectivity with one or more servers 62. As with the arrangement above, the various functions of a server 62 may be provided by either or both of the access nodes and/or by one or more other entities.

With this arrangement, one or more mobile devices (including perhaps mobile device 14) that are operating within the coverage 50 of access node 52 may track their geographic location when in such coverage and may report that location to server 62 so that server 62 can thereby build up a definition of the geographic scope of coverage area 50. Further, or perhaps as part of that process, mobile device 14 may itself track its geographic location when within coverage 50 of access node 52 and may itself build up in its data storage a definition of the geographic scope of coverage are 50. Still further, mobile device 14 or server 62 may track the duration of each of one or more discrete instances of the mobile device being in that geographic scope and may determine based on that duration data whether the device tends to be in that geographic scope at least a threshold duration per discrete instance.

Provided with that information, the mobile device 14 and/or server 62 may then further detect a current discrete instance of the mobile device being in the defined geographic scope of coverage area 50, such as by determining when the mobile device's current geographic location is within the defined geographic scope. Responsive to detecting the current instance, and given that (i.e., further responsive to) the having a tendency, per the one or more past discrete instances, to be in the defined geographic scope for at least the threshold duration, the device and/or server may then cause the device to begin scanning for wireless network coverage, such as coverage provided by access node 52.

Furthermore, with this arrangement, mobile device 14 and/or server 62 (perhaps specifically access node 56 or associated network infrastructure) may focus instead on the mobile device's presence in second coverage area 54 as a basis to trigger scanning for coverage of access node 52 (coverage area 50). In particular, the area at issue may be the coverage area of access node 56, which could be defined and detected geographically as described above with respect to coverage area 50 and/or may be defined and detected with respect to air interface communication between mobile device 14 and access node 56.

By way of example, device 14 and/or server 62 may track the duration of each discrete instance of device 14 operating in coverage area 54, such as each instance when the device is continuously registered with access node 56 for operation in coverage area 56, regardless of whether the device is currently idle or active. As noted above, device presence in the coverage area can be established by the device receiving air interface communications (e.g., pilot signals or other communications) from the access node 56 and/or the access node 56 receiving communications from the device, or in various other ways. The device and/or server may then establish a representative measure of how long the device tends to be in coverage area 54 and may determine that the representative measure is at least the threshold duration.

Further, the device and/or server may detect a current discrete instance of the device being in coverage area 54 of access node 56, using the same or other mechanism as used to detect the past discrete instances. In response to detecting that current instance and determining, based on the past discrete instances, that the device has a tendency to be in the coverage area for at least the threshold duration, the device and/or server may then cause the device to begin scanning for wireless network coverage. In particular, for example, the device and/or server may cause the device to begin scanning for coverage 50 of access node 52. For instance, logic in the device may cause the device to turn on a transceiver to begin scanning for such coverage, and/or to tune a transceiver to scan for coverage 50. Or logic in the server may cause the server to send a control message to the device to cause the device to begin such scanning.

In these or other examples, the device and/or the server or other entity may maintain data that correlates a particular area at issue with particular wireless coverage, such as a specific wireless coverage area having a specific coverage area identifier. This data can be established dynamically through the processes discussed above (such as by detecting past instances of device presence in that particular coverage area), or may be defined in advance by engineers or in other ways. In practice, the device and/or server may then refer to this data in order to determine, in response to a current instance of the device being in the particular area and a determination from past discrete instances that the device tends to be in the particular area for at least the threshold duration, that the device should begin scanning for the particular wireless coverage. The device and/or server may then specifically direct the device to begin scanning for that particular wireless coverage, such as to scan for pilot signals or the like that specify or otherwise embody the associated coverage area identifier.

Functions of the present method can be encoded in a set of program instructions stored on a non-transitory machine readable medium, such as magnetic, optical, or other data storage for instance, to be executed by a processor. In addition or alternatively, the functions can be specifically carried out by one or more devices or servers as discussed above.

Figure 5:
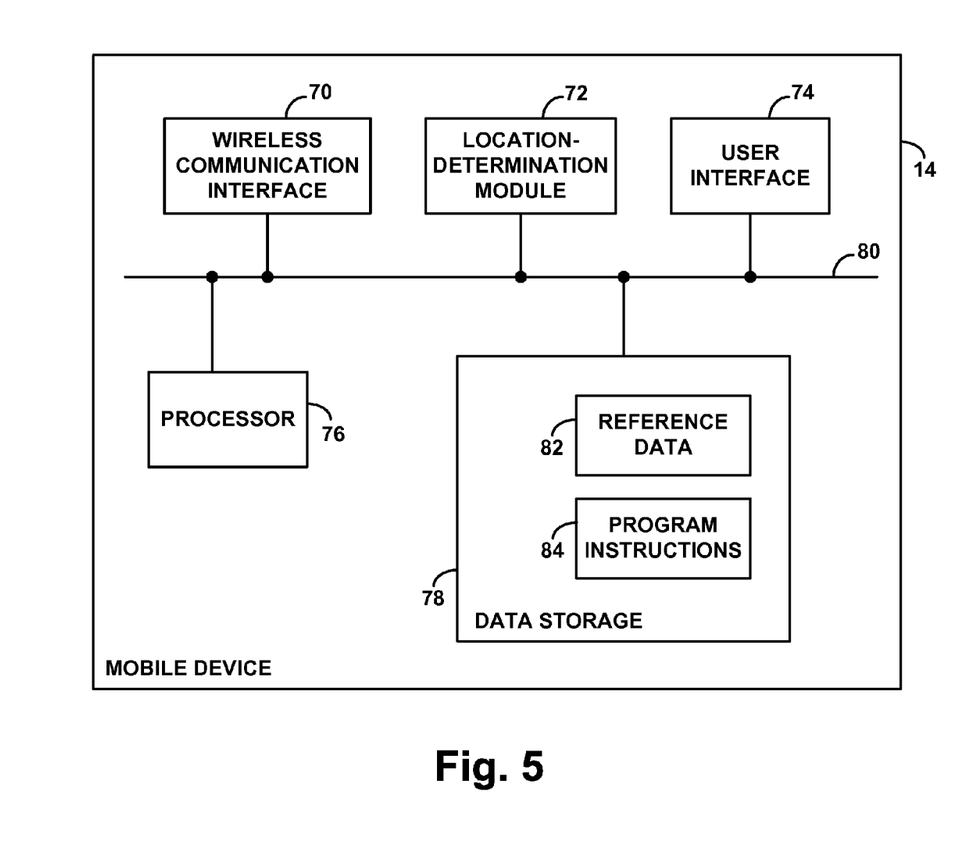
FIG. 5 is a simplified block diagram of a mobile device operable within he method.

FIG. 5 is next a simplified block diagram of mobile device 14, showing functional components that can be included in such a device to facilitate implementation of the present method in practice. As shown, the example device includes a wireless communication interface 70, a location-determination module 72, a user interface 74, a processor 76, and data storage 78, all of which may be coupled together by a system bus, network, or other connection mechanism 80.

Wireless communication interface 70 comprises one or more wireless communication modules with associated antennas for facilitating air interface communication according to one or more air interface protocols with one or more wireless access nodes, including a transceiver to scan for wireless network coverage in accordance with the method. Location-determination module 72 comprises one or more modules that facilitates determination of the location of the mobile device, such as a GPS receiver, an RFID scanner or tag, or the like. User interface 74 comprises one or more input and output components to facilitate interaction with a user of the device is appropriate (if the device is one that interacts with a user). Processor 76 comprises one or more general purpose processors (e.g., INTEL microprocessors) and/or one or more special purpose processors (e.g., digital signal processors, application specific integrated circuits, etc.). And data storage 78 comprises one or more volatile and/or non-volatile storage components. These various elements may be integrated together, distributed, or modified in various ways, and the device may more of fewer elements than these.

In practice as shown, data storage may contain reference data 82 and program instructions 84. The reference data 82 may include a definition of the area at issue, geographically or in some other way such as described above for instance. Further, the data may comprise a record of duration per discrete instance of the device being in the area, as well as an established representative measure of how long the device tends to be in the area per discrete instance and an indication of whether that measure is at least as long as a defined threshold duration. The program instructions 84 may then comprise instructions executable by the processor 76 to carry out various mobile device functions described herein, such as to determine from durations of past discrete instances, that the device tends to be in the area for at least the threshold duration, to detect a current discrete instance of the device being in the area, and to respond to the combination of those determinations by causing the device to begin scanning for wireless network coverage.

Figure 6:
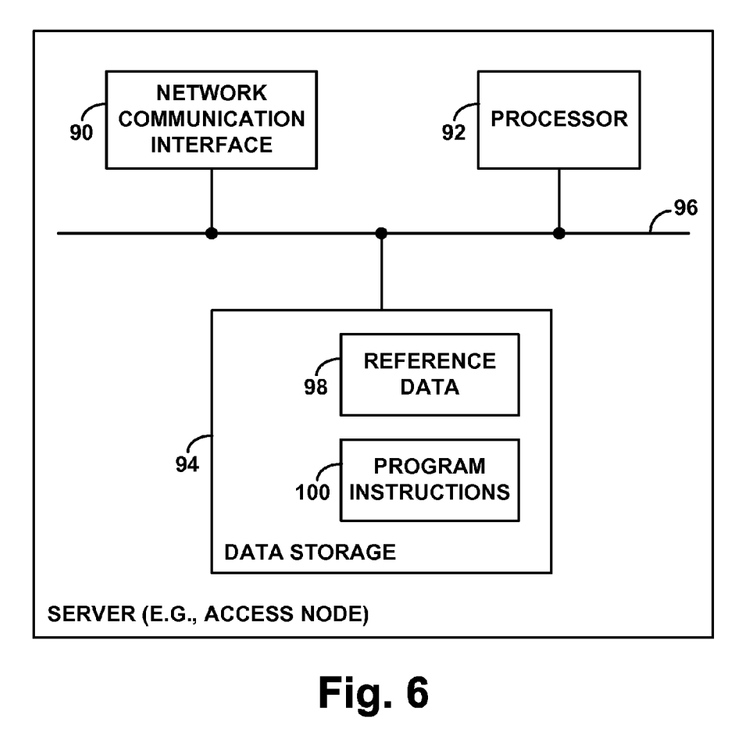
FIG. 6 is a simplified block diagram of a server operable within the method.

FIG. 6 is next a simplified block diagram of a server (perhaps one of the described access nodes or other network entity), showing functional components that can be included in such an entity to facilitate implementation of the present method in practice. As shown, the example server includes a network communication interface 90, a processor 92, and data storage 94, all of which may be coupled together by a system bus, network, or other connection mechanism 96.

Network communication interface 90 comprises one or more communication modules for facilitating communication on a network, perhaps including air interface communication with mobile device 14. Processor 92 comprises one or more general purpose processors (e.g., INTEL microprocessors) and/or one or more special purpose processors (e.g., digital signal processors, application specific integrated circuits, etc.) And data storage 94 comprises one or more volatile and/or non-volatile storage components. These various elements may be integrated together, distributed, or modified in various ways, and the server may more or fewer elements than these.

As shown, data storage may similarly include reference data 98 and program instructions 100. The reference data 98 may include a definition of the area at issue, geographically or in some other way such as described above for instance. Further, the data may comprise a record of duration per discrete instance of the device being in the area, as well as an established representative measure of how long the device tends to be in the area per discrete instance and an indication of whether that measure is at least as long as a defined threshold duration. The program instructions 100 may then comprise instructions executable by the processor 92 to carry out various server functions described herein, such as to determine from durations of past discrete instances, that the device tends to be in the area for at least the threshold duration, to detect a current discrete instance of the device being in the area, and to respond to the combination of those determinations by causing the device to begin scanning for wireless network coverage.

An exemplary embodiment has been described above. Those of ordinary skill in the art will appreciate, however, that numerous variations can be made from the embodiment described, while remaining within true scope and spirit of the invention.

We claim:

1. A method comprising:
    determining, based on one or more past discrete instances of a mobile device being in a particular area, that the mobile device tends to be in the particular area for at least a threshold duration per instance;
    detecting a current discrete instance of the mobile device being in the particular area; and
    responsive to a combination of the determining and the detecting, causing the mobile device to begin scanning for wireless network coverage.

2. The method of claim 1, wherein the method is carried out by the mobile device.

3. The method of claim 1, wherein the method is carried out by a network server.

4. The method of claim 1, wherein the particular area is a wireless coverage area of a network operating according to a first air interface technology, and wherein scanning for wireless network coverage comprises scanning for coverage under a second air interface technology different than the first air interface technology.

5. The method of claim 4, wherein the first air interface technology is a cellular wide area network technology, and the second air interface technology is a wireless local area network technology.

6. The method of claim 5, wherein the wireless local area network technology is WIFI.

7. The method of claim 1, wherein the particular location is a wireless coverage area of a macro cellular network base station, and wherein scanning for wireless network coverage comprises scanning for coverage of a femto cellular network base station.

8. The method of claim 1, further comprising referring to correlation data that correlates the particular area with particular wireless network coverage, to determine based on the particular area which wireless network coverage the mobile device should scan for, wherein causing the mobile device to scan for wireless network coverage comprises causing the mobile device to scan for the determined wireless network coverage.

9. The method of claim 8, further comprising establishing the correlation data based on past detection of the particular wireless network coverage in the particular area.

10. A non-transitory machine readable medium having stored thereon instructions executable by a processor to perform functions comprising:
    establishing a representative measure of how long a mobile device tends to be in a particular area, based at least on one or more durations of stay of the mobile device in the particular area in one or more past discrete instances of the mobile device being in the particular area;
    determining that the representative measure is at least a threshold duration;
    detecting a current discrete instance of the mobile device being in the particular area; and
    responsive to a combination of the determining and the detecting, causing the mobile device to begin scanning for wireless network coverage.

11. The non-transitory machine readable medium of claim 10, wherein the particular area is a wireless coverage area of a network operating according to a first air interface technology, and wherein scanning for wireless network coverage comprises scanning for coverage under a second air interface technology different than the first air interface technology.

12. The non-transitory machine readable medium of claim 11, wherein the first air interface technology is a cellular wide area network technology, and the second air interface technology is a wireless local area network technology.

13. The non-transitory machine readable medium of claim 12, wherein the wireless local area network technology is WIFI.

14. The non-transitory machine readable medium of claim 10, wherein the particular area is a wireless coverage area of a macro cellular network base station, and wherein scanning for wireless network coverage comprises scanning for coverage of a femto cellular network base station.

15. The non-transitory machine readable medium of claim 10, wherein the functions further comprise:
    referring to correlation data that correlates the particular area with particular wireless network coverage, to determine based on the particular area which wireless network coverage the mobile device should scan for, wherein causing the mobile device to scan for wireless network coverage comprises causing the mobile device to scan for the determined wireless network coverage.

16. The non-transitory machine readable medium of claim 15, wherein the functions further comprise:
establishing the correlation data based on past detection of the particular wireless network coverage in the particular area.

17. The non-transitory machine readable medium of claim 10, wherein the non-transitory machine readable medium is in the mobile device.

18. The non-transitory machine readable medium of claim 10, wherein the non-transitory machine readable medium is in a network server.

19. A method comprising:
establishing a typical duration that a mobile device tends to be in a particular area, wherein establishing the typical duration comprises (i) detecting a plurality of separate instances of the mobile device being in the particular area, (ii) determining durations of stay of the mobile device in the particular area for the detected plurality of instances, and (iii) establishing the typical duration based on the determined durations of stay;
after detecting the plurality of instances, detecting a new separate instance of the mobile device being located in the particular area;
determining that the established typical duration is at least a predefined threshold duration; and
responsive to detecting the new separate instance of the mobile device being located in the particular area and determining that the established typical duration that the mobile device tends to be in the particular location is at least the predefined threshold duration, causing the mobile device to begin scanning for wireless network coverage.

20. The method of claim 19, wherein the particular area is a wireless coverage area of a first type, and wherein scanning for wireless network coverage comprises scanning for wireless coverage of a second type.

* * * * *